United States Patent [19]

Brown et al.

[11] Patent Number: 4,866,130

[45] Date of Patent: Sep. 12, 1989

[54] SOLVENT-RESISTANT, COMPATIBLE BLENDS OF POLYPHENYLENE ETHERS AND THERMOPLASTIC POLYESTERS

[75] Inventors: Sterling B. Brown; Dennis J. McFay; both of Schenectady, John B. Yates III, Glenmont and Gim Furn Lee, Albany, N.Y.

[73] Assignee: General Electric Company, Schenectady, N.Y.

[21] Appl. No.: 154,751

[22] Filed: Feb. 9, 1988

Related U.S. Application Data

[63] Continuation-in-part of Ser. No. 891,457, Jul. 29, 1986, abandoned, which is a continuation-in-part of Ser. No. 761,712, Aug. 2, 1985, abandoned, and a continuation-in-part of Ser. No. 828,410, Feb. 11, 1986, abandoned.

[51] Int. Cl.$^4$ .................. C08L 51/04; C08L 53/02; C08L 71/04

[52] U.S. Cl. .................. 525/92; 525/63; 525/66; 525/67; 525/68; 525/88; 525/905

[58] Field of Search .................. 525/92, 66, 67, 68

[56] References Cited

U.S. PATENT DOCUMENTS

| | | |
|---|---|---|
| 3,218,372 | 8/1961 | Okamura et al. |
| 3,221,080 | 11/1965 | Fox |
| 3,963,804 | 6/1976 | Yonemitsu et al. |
| 4,090,996 | 3/1978 | Gergen et al. .................. 525/92 |
| 4,123,410 | 10/1978 | Lee, Jr. .................. 525/92 |
| 4,220,735 | 9/1980 | Dieck et al. .................. 525/92 |
| 4,507,436 | 3/1985 | Axelrod et al. |
| 4,672,086 | 6/1987 | Seiler et al. .................. 524/127 |
| 4,704,430 | 11/1987 | Freitag et al. |

FOREIGN PATENT DOCUMENTS

| | | |
|---|---|---|
| 0037547 | 3/1981 | European Pat. Off. |
| 0186011 | 7/1986 | European Pat. Off. |
| 57-209956 | 12/1982 | Japan |
| 59-159847 | 9/1984 | Japan |
| 87/850 | 2/1987 | PCT Int'l Appl. .................. 525/92 |

*Primary Examiner*—Jacob Ziegler
*Attorney, Agent, or Firm*—William H. Pittman; James C. Davis, Jr.

[57] ABSTRACT

Solvent-resistant resin blends with a wide variety of desirable impact and tensile properties are prepared from a polyphenylene ether having a low proportion of unneutralized amino nitrogen or a blend thereof with a polystyrene; a poly(ethylene terephthalate), poly(butylene terephthalate), elastomeric polyester or mixture thereof; at least one elastomeric polyphenylene ether-compatible impact modifier and at least one polymer containing a substantial proportion of aromatic polycarbonate units as a compatibilizing agent. There may also be present a minor amount of at least one epoxide such as triglycidyl isocyanurate.

23 Claims, No Drawings

SOLVENT-RESISTANT, COMPATIBLE BLENDS OF POLYPHENYLENE ETHERS AND THERMOPLASTIC POLYESTERS

This application is a continuation-in-part of copending application Ser. No. 891,457, filed July 29, 1986, which in turn is a continuation-in-part of Ser. No. 761,712, filed Aug. 2, 1985, and Ser. No. 828,410, filed Feb. 11, 1986, all now abandoned.

This invention relates to novel resinous compositions with high impact strength, resistance to solvents and thermal distortion, tensile strength and thermal stability. More particularly, it relates to improved compositions comprising polyphenylene ethers and linear polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the thermoplastic polyesters including poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

The present invention provides polymer blends having a high degree of impact strength and resistance to solvents and heat distortion. It also provides highly compatible polymer blends containing polyphenylene ethers and poly(alkylene dicarboxylates), and resinous molding compositions suitable for use in the fabrication of automotive parts nd the like.

The invention is based on the discovery of a new genus of compatible blends containing polyphenylene ethers and poly(alkylene dicarboxylates) in weight ratios as high as 1.2:1, and a method for their preparation. According to the invention, there are also incorporated in the resinous composition an impact modifier and a compatibilizing agent containing a substantial proportion of aromatic polycarbonate structural units.

In one of its aspects, therefore, the invention is directed to resinous compositions free from phosphorus-containing flame retardants and comprising the following resinous components and any reaction products thereof, all percentage proportions being by weight of total resinous components:

(A) about 25–60% of at least one polyphenylene ether containing at most 800 ppm. of unneutralized amino nitrogen, or a blend thereof with at least one polystyrene;

(B) about 30–60% of at least one polyester selected from the group consisting of (B-1) those consisting essentially of structural units of the formula

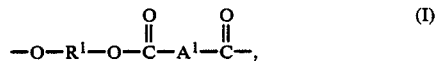

wherein $R^1$ is a saturated $C_{2-10}$ divalent aliphatic or alicyclic hydrocarbon radical and $A^1$ is a divalent aromatic radical containing about 6–20 carbon atoms; (B-2) those consisting essentially of units of formula I and units of the formula

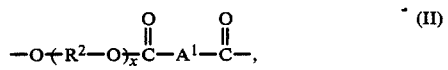

wherein $R^2$ is a saturated $C_{2-4}$ divalent aliphatic hydrocarbon radical and x has an average value of at least about 10; and (B-3) those consisting essentially of units of formula I and units of the formula

wherein $R^3$ is a $C_{3-6}$ saturated divalent aliphatic hydrocarbon radical;

(C) about 5–25% of at least one elastomeric polyphenylene ether-compatible impact modifier; and (D) 3–20% of at least one polymer containing a substantial proportion of aromatic polycarbonate units and having a weight average molecular weight of at least about 40,000 as determined by gel permeation chromatography relative to polystyrene, or a blend thereof with a styrene homopolymer.

Another aspect of the invention is compositions consisting essentially of the above-described components A, B, C and D.

It is not certain whether any or all of the components in these compositions interact chemically upon blending. Therefore, the invention includes compositions comprising said components and any reaction products thereof, as well as other optional components described hereinafter.

The polyphenylene ethers (also known as polyphenylene oxides) used as all or part of component A in the present invention comprise a plurality of structural units having the formula

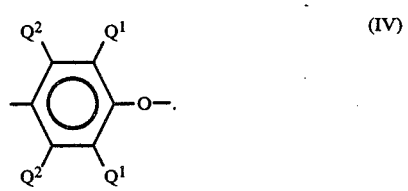

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, se-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulas

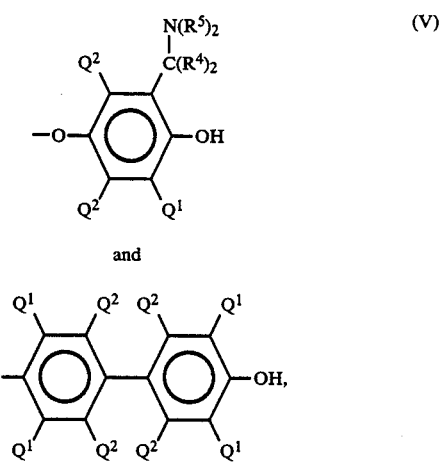

and wherein $Q^1$ and $Q^2$ are as previously defined; each $R^4$ is independently hydrogen or alkyl, with the proviso that the total number of carbon atoms in both $R^4$ radicals is 6 or less; and each $R^5$ is independently hydrogen or a $C_{1-6}$ primary alkyl radical. Preferably, each $R^4$ is hydrogen and each $R^5$ is alkyl, especially methyl or n-butyl.

Polymers containing the end groups of formula V (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

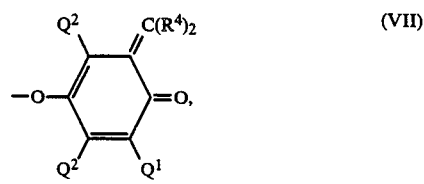

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula VI are typically obtained from reaction mixtures in which a by-product diphenoquinone of the formula

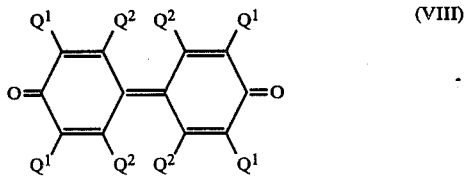

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas V and VI. In particular, polyphenylene ethers originally containing at least about 60% by weight of molecules having aminoalkyl end groups of formula V are contemplated for use in the present invention.

The use of polyphenylene ethers containing substantial amounts of unneutralized amino nitrogen generally affords compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

According to the present invention, therefore, a substantial proportion of any amino compounds in the polyphenylene ether is removed or inactivated. Polymers so treated are sometimes referred to hereinafter as "inactivated polyphenylene ethers". They contain unneutralized amino nitrogen, if any, in amounts no greater than 800 ppm. and more preferably in the range of about 100–800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, diethyl maleate, citraconic acid, citraconic anhydride, itaconic acid, itaconic anhydride, fumaric acid, methyl fumarate and pyromellitic dianhydride. Because of their relatively high reactivity with amino compounds, the free carboxylic acids and their anhydrides, especially fumaric acid and pyromellitic dianhydride, are generally most useful.

Reaction of the polyphenylene ether with the acid or anhydride may be achieved by heating at a temperature within the range of about 230°–390° C., in solution or preferably in the melt. In general, about 0.3–2.0 and preferably about 0.5–1.5 parts (by weight) of acid or anhydride is employed per 100 parts of polyphenylene ether. Said reaction may conveniently be carried out in an extruder or similar equipment. It is sometimes advantageous to incorporate the impact modifier (component C) in the composition at this stage.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of creating a pressure of about 200 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula VII. Polyphenylene ethers having a free amine nitrogen content below about 600 ppm. have been found particularly useful in this invention. However, the invention is not dependent on any theory of inactivation.

The preparation of inactivated polyphenylene ethers by reaction with acids or anhydrides, optionally in combination with vacuum venting during extrusion, is illustrated by the following examples. All parts in the examples herein are by weight.

EXAMPLE 1

A mixture of 1.43 parts of maleic anhydride and 100 parts of a poly-(2,6-dimethyl-1,4-phenylene ether) containing about 1000 ppm. of nitrogen and at least about 75% of molecules with aminoalkyl end groups, and having a number average molecular weight (as determined by gel permeation chromatography) of about 20,000 and an intrinsic viscosity in chloroform at 25° C. of 0.46 dl./g., was tumble-mixed for 15–30 minutes and then extruded on a 20-mm. twin screw extruder at 400 rpm. over a temperature range of about 310°–325° C. The feed rate of the mixture was about 524 grams per 10 minutes. The extruder was vacuum vented with a vacuum pump to a pressure less than 20 torr during the extrusion. The product was the desired inactivated polyphenylene ether; it contained 438 ppm. nitrogen.

EXAMPLES 2–5

The procedure of Example 1 was repeated, substituting 0.7, 0.8, 1.0 and 1.4 parts (respectively) of fumaric acid for the maleic anhydride and extruding over a temperature range of about 300°–325° C. Similar products were obtained. The product of Example 2 contained about 600 ppm. nitrogen.

EXAMPLE 6

The procedure of Example 2 was repeated, substituting 0.7 part of citric acid for the fumaric acid. A similar product was obtained.

EXAMPLE 7

One hundred parts of the polyphenylene ether of Example 1 was extruded with vacuum venting, blended with 1.5 parts of pyromellitic dianhydride and again extruded at 350°–360° C. The product was the desired inactivated polyphenylene ether.

EXAMPLE 8

A mixture of 100 parts of the polyphenylene ether of Example 1, 30 parts of "SEBS" as defined hereinafter and 1.5 parts of pyromellitic dianhydride was extruded at 260°–310° C., with atmospheric venting, to produce the desired inactivated polyphenylene ether-impact modifier combination.

Component A may also contain at least one polystyrene. The term "polystyrene" as used herein includes polymers prepared by methods known in the art including bulk, suspension and emulsion polymerization, which contain at least 25% by weight of structural units derived from a monomer of the formula

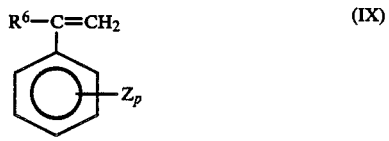

(IX)

wherein $R^6$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer. These rubber-modified polystyrenes include high impact polystyrene, or HIPS.

The proportion of polystyrene in component A is not critical, since polyphenylene ethers and polystyrenes are miscible in all proportions. Component A will generally contain about 5–50% (by weight) polystyrene, if any.

Component B is at least one thermoplastic polyester consisting essentially of structural units of formula I, or a combination of units of formula I and units of formula II or III. In one embodiment of the invention, the polyester consists essentially of units of formula I. The $R^1$ value therein is a $C_{2-10}$ saturated divalent aliphatic or alicyclic hydrocarbon radical, usually ethylene or tetramethylene, and $A^1$ is a divalent aromatic radical containing about 6–20 carbon atoms and preferably phenylene.

These polyesters generally have number average molecular weights in the range of about 20,000–70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000.

Such polyesters are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. Poly(ethylene terephthalate) and poly(butylene terephthalate), and especially the latter, are preferred; they are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

U.S. Pat. No. 4,672,086 discloses compositions comprising a polyphenylene ether, a poly(ethylene terephthalate) or poly(butylene terephthalate), a phosphorus-containing flame retardant and "framework-formimg fillers". Said compositions may also contain polycarbonates, elastomeric polymers which serve as impact modifiers, and/or polystyrenes. The present invention differs from that of the aforementioned patent in two respects. First, it does not contemplate the presence of phosphorus-containing flame retardants, nor, usually, of framework-forming fillers. Second, the presence of polycarbonate (component D) is essential, said polycarbonate serving as a compatibilizer as more fully disclosed hereinafter.

In another embodiment of the invention, component B is entirely or partially an elastomeric polyester containing structural units of formula II or III, most often in combination with those of formula I. The $R^2$ values in formula II are similar to $R^1$, usually tetramethylene, and $R^3$ in formula III is usually pentamethylene.

The polyesters with formula II units may be prepared by incorporating a polyalkylene ether glycol, preferably poly(tetramethylene ether) glycol, in the dioldicarboxylic acid reaction mixture. The average value of x in the polyalkylene ether glycol is in the range of about 5–70, and the units incorporating it usually comprise about 5–85% by weight of the polyester.

The elastomeric polyesters with formula III units may be prepared by incorporating a lactone, preferably caprolactone, in the diol-dicarboxylic acid reaction mixture. The lactone units in said polyesters typically comprise about 15–40 mole percent thereof.

It is also within the scope of the invention to employ as component B a mixture of component B-1 with at least one of components B-2 and B-3. Said components may be present in any proportions; usually, component B-2 or B-3 comprises at least about 5%, most often about 10–90% and preferably about 30–70% by weight of component B, with the balance being component B-1. The units of formulas II and III generally comprise at least about 15% by weight of total component B. By this method, a spectrum of products with varying impact and tensile properties may be obtained. It is frequently found that tensile strength increases and impact strength decreases in the compositions of this invention with an increasing proportion of units of formula II or III.

Still another aspect of the invention is compositions comprising components A, C and D and at least one of components B-2 and B-3, or a mixture of at least about 5% by weight thereof, based on total component B, of component B-1.

Because of the tendency of polyesters to undergo hydrolytic degradation at the high extrusion and molding temperatures encountered by the compositions of this invention, it is preferred that the polyester used as component B be substantially free of water.

Because of the presence of both polyesters and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01–7.5% by weight of total polyester. It is generally preferred to precompound said exchange suppressing agent with the polyester, since it is frequently found that the impact strengths of the compositions of this invention are substantially decreased if the exchange suppressing agent is incorporated directly therein. Precompounding may be achieved by direct blending or by forming a concentrate, typically with about 1–25% by weight of total polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

Component C is at least one elastomeric polyphenylene ether-compatible impact modifier. Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or decrease the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

According to the present invention, the tendency of blends of components A and B to be incompatible is overcome by incorporating component D in the composition. The essential ingredient of component D is a polymer containing a substantial proportion of aromatic polycarbonate units.

Among the preferred polymers of this type are the aromatic homopolycarbonates. The structural units in such homopolycarbonates generally have the formula $$-O-A^2-O-\overset{O}{\underset{\|}{C}}-, \qquad (X)$$

wherein $A^2$ is an aromatic radical. Suitable $A^2$ values include m-phenylene, p-phenylene, 4,4'-biphenylene, 2,2-bis(4-phenylene)propane, 2,2-bis(3,5-dimethyl-4-phenylene)-propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula $$-A^3-Y-A^4-, \qquad (XI)$$

wherein each of $A^3$ and $A^4$ is a single-ring divalent aromatic radical and Y is a bridging radical in which one or two atoms separate $A^3$ from $A^4$. The free valence bonds in formula XI are usually in the meta or para positions of $A^3$ and $A^4$ in relation to Y. Such $A^2$ values may be considered as being derived from bisphenols of the formula $HO-A^3-Y-A^4-OH$. Frequent reference to bisphenols will be made hereinafter, but it should be understood that $A^2$ values derived from suitable compounds other than bisphenols may be employed as appropriate.

In formula XI, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula XI is the 2,2-bis(4-phenylene)propane radical, which is derived from bisphenol A and in which Y is isopropylidene and $A^3$ and $A^4$ are each p-phenylene.

Any known method of preparing homopolycarbonates may be used for preparing component D. Included are interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. No. 4,644,053.

Various copolycarbonates are also useful as component D, either alone or in admixture with homopolycarbonates. One example thereof is the copolyestercarbonates of the type obtained by the reaction of at least one dihydroxyaromatic compound with a mixture of phosgene and at least one dicarboxylic acid chloride, especially isophthaloyl chloride, terephthaloyl chloride or both. Such copolyestercarbonates contain structural units of formula X combined with units of the formula

(XII)

wherein $A^5$ is an aromatic and usually a p- or m-phenylene radical. Other examples are the siloxane-carbonate block copolymers disclosed, for example, in U.S. Pat. Nos. 3,189,662 and 3,419,634, and the polyphenylene ether-polycarbonate block copolymers of U.S. Pat. Nos. 4,374,223 and 4,436,876, which frequently provide compositions with substantially higher heat distortion temperatures than those containing homopolycarbonates. The disclosures of the patents and applications listed above relating to polycarbonates and copolycarbonates are also incorporated by reference herein.

The copolycarbonates should, for the most part, contain at least about 20% by weight of carbonate structural units. When the copolymeric units are other than ester units, the polymer preferably contains at least about 45% carbonate units.

The weight average molecular weight of the homoor copolycarbonate should be at least about 40,000 (as determined by gel permeation chromatography relative to polystyrene) for maximum impact strength. It is most often in the range of about 50,000-200,000.

In most instances, component D consists of the polycarbonate or copolycarbonate; that is, said polymer is the entire component except for impurities. It is within the scope of the invention, however, to use as component D a blend of a polycarbonate or polyester-polycarbonate with a styrene homopolymer, typically having a number average molecular weight of about 50,000-250,000. Such blends generally contain at least 50% of the polycarbonate or polyester-polycarbonate.

It will be noted that various polystyrenes may be used in the invention as all or part of components A, C and D. However, the specific polystyrenes used are different in various respects. The polystyrene in component A is a homopolymer, random copolymer or rubber-modified polystyrene; component C may be a block or core-shell copolymer; and homopolymers are used in component D. Moreover, polystyrenes are ordinarily present in only one of components A and D, if in either.

Also within the scope of the invention is the employment of a polyester-aromatic polycarbonate blend as a source of part or all of components B and D.

It is frequently found that impact strength and/or resistance to heat distortion are improved if there is also blended into the composition (E) at least one compound containing a plurality of epoxide moieties, generally in the amount of about 0.1-3.0 and preferably about 0.25-3.0 part per 100 parts of total components A, B, C and D. Illustrative compounds of this type are homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

Component E may be introduced by blending with the other components in a single operation. However, its effectiveness may be maximized by preblending with component B, typically by dry mixing followed by preextrusion. Such preblending frequently increases the impact strength of the composition.

While the reason for the effectiveness of component E is not entirely understood, said component is believed to increase molecular weight, melt viscosity and degree of branching of the polyester by reaction with carboxylic acid end groups of a plurality of polyester molecules. The effect of component E is particularly pronounced when the weight average molecular weight of the polycarbonate is less than about 150,000, and especially when it is less than about 80,000.

Components A and B are present in the amounts of about 25-60% and about 30-60%, respectively, of total resinous components. Most often, component A comprises about 25-45% and preferably about 30-45%, and component B comprises about 30-50% and preferably about 30-46%. When high impact strength is desired, the weight ratio of component A to component B should be at most about 1.2:1.

Component C, the elastomeric impact modifier, may be present in the amount of about 5-25% and especially about 10-20%. Since a decrease in the proportion of component C frequently increases heat distortion temperature, the level thereof should be minimized if high resistance to heat distortion is desired. Component D is present in the range of 3-20% and most often 3-12%.

The chemical role of the inactivated polyphenylene ether in the compositions of this invention is not fully understood, and any reliance on chemical theory as a basis for the invention is specifically disclaimed. It is believed, however, that the presence of more than a certain minimum proportion of amino compounds in the polyphenylene ether can cause degradation in the molecular weight of the polycarbonate and/or polyester. If this is true, the removal or neutralization of the greater part of such amino compounds produces an environment in which high molecular weight is maintained in the polycarbonate (thus maximizing its effect as a compatibilizing agent) and polyester.

It is within the scope of the invention for the composition to contain other conventional ingredients such as fillers (especially non-"framework-forming fillers"), flame retardants (preferably non-phosphorus-containing), pigments, dyes, stabilizers, anti-static agents, mold release agents and the like. The presence of other resinous components is also contemplated. These include impact modifiers compatible with component B, such as various graft and core-shell copolymers of such monomers as butadiene, styrene, butyl acrylate and methyl methacrylate. It is frequently preferred to preextrude such impact modifiers with component B prior to its utilization in the invention. By this method, compositions having improved ductility at low temperatures may be prepared.

Also included as other resinous components are other impact and processability modifiers for component A, such as olefin copolymers. In general, the amounts of any other resinous components, if present, will not exceed about 15% by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100°-325° C.

The extrusion conditions may affect the impact strength and other properties of the composition. For example, it is sometimes found that the impact strength of the composition is increased if it is extruded more than once, thereby insuring effective blending.

In another embodiment, a single extruder is employed which has at least two ports for introduction of ingredients, one such port being downstream from the other. Component A or any reactants for preparation thereof and at least a portion of component C are introduced through the first port and extruded, preferably at a temperature in the range of about 300°-350° C. This portion of the extruder is preferably vacuum vented.

The remaining ingredients are introduced through the downstream port and extrusion is continued, preferably at a lower temperature to minimize degradation of components B, C and D. For further minimization of degradation, it may be advantageous to introduce a portion of component C at this point. Typical extrusion temperatures at this stage are in the range of about 260°-320° C.

In the following examples illustrating the inventions, the blend constituents used were as follows:

Component A
PPE—a poly(2,6-dimethyl-1,4-phenylene ether) having a number average molecular weight of about 20 000 and an intrinsic viscosity in chloroform at 25° C. of 0.46 dl./g., which has been extruded on a twin screw extruder within the temperature range of about 300°-315° C., with vacuum venting to a maximum pressure of 20 torr; it contained 438 ppm. nitrogen.
Example 1, etc.—the products of the designated examples.

Component B
PBT(50,000) and PBT(25,000)—poly(butylene terephthalates) having the designated number average molecular weights, as determined by gel permeation chromatography.
PBT-CL—a commercially available poly(butylene terephthalate)-caprolactone copolyester containing about 72 mole percent butylene terephthalate units and about 28 mole percent caprolactone units.
PTME(50,000) and PTME(54,000)—commercially available elastomeric polyterephthalates from mixtures of tetramethylene glycol and poly(tetramethylene ether) glycol, having the designated number average molecular weights and about 20% and 50% by weight, respectively, of poly(tetramethylene ether) glycol units.

Component C
SEBS—a commercially available triblock copolymer with polystyrene end blocks having weight average molecular weights of 29,000 and a hydrogenated butadiene midblock having a weight average molecular weight of 116,000.
SB(H)—a styrene-butadiene diblock copolymer having a weight average molecular weight of about 164,000 and a butadiene-styrene weight ratio of about 2:1, in which the butadiene block has been hydrogenated.
CS—a core-shell polymer with a poly(butyl acrylate) core and polystyrene shell, connected via an interpenetrating network.

Component D
PC(50,000), PC(66,000), PC(71,000), PC(192,000)—bisphenol A homopolycarbonates prepared interfacially and having the designated weight average molecular weights.
PE-PC—a polyester-polycarbonate containing 78 mole percent polyester and 22 mole percent polycarbonate units and having a weight average molecular weight of about 50,000, prepared by the interfacial reaction of bisphenol A with phosgene and a 93:7 (by weight) mixture of isophthaloyl and terephthaloyl chloride.
PC-Trans—a bisphenol A homopolycarbonate prepared by transesterification of diphenyl carbonate and having a weight average molecular weight of about 37,000.
Allyl-PC—a copolycarbonate of 97.3 mole percent bisphenol A and 2.7 mole percent 2,2-bis(3-allyl-4-hydroxyphenyl)propane, prepared interfacially and having a weight average molecular weight of about 47,000.

Component E
TGIC—triglycidyl isocyanurate.
GMA—a glycidyl methacrylate homopolymer having an intrinsic viscosity in chloroform at 25° C. of 0.16.
GMA-AA(15) and GMA-AA(30)—commercially available terpolymers of glycidyl methacrylate, methyl methacrylate and a lower alkyl acrylate, respectively containing 15% and 30% (by weight) glycidyl methacrylate units and having weight average molecular weights of about 11,400 and 9,000.
GMA-M—a commercially available copolymer of glycidyl methacrylate (50% by weight) and methyl methacrylate, having a weight average molecular weight of about 10,000.
GMA-S—a commercially available copolymer of glycidyl methacrylate (50% by weight) and styrene, having a weight average molecular weight of about 11,000.
GMA-S-M—a commercially available terpolymer of glycidyl methacrylate (50% by weight), styrene and methyl methacrylate, having a weight average molecular weight of about 10,000.
GMA-S-A(10A), GMA-S-A(10B), GMA-S-A(20)—commercially available terpolymers of glycidyl methacrylate, styrene and acrylonitrile, respectively containing 10%, 10% and 20% (by weight) glycidyl methacrylate and having weight average molecular weights of about 8,700, 50,000 and 8,100.

Percentages and other proportions in the examples are by weight and are based on total resinous constituents. Impact and tensile values were determined in British units and have been converted to metric units. Heat distortion temperatures are at 0.455 MPa. unless otherwise indicated.

EXAMPLES 9-13

A series of compositions according to the invention was prepared by tumble mixing the ingredients in a jar mill for ½ hour and extruding at 120°-260° C. (Examples 9-11) or 350°-360° C. (Examples 12-13) on a twin screw extruder with a screw speed of 400 rpm. The extrudate was quenched in water and pelletized. The pellets were then injection molded into test bars which were evaluated for notched Izod impact strength (ASTM procedure D256), heat distortion temperature and tensile properties (ASTM procedure D638). The relevant parameters and test results are given in Table I.

TABLE I

| Example | | 9 | 10 | 11 | 12 | 13 |
|---|---|---|---|---|---|---|
| Component A: | Example 1, % | 40 | 41.4 | 40 | — | — |
| | Example 7, % | — | — | — | 40 | 40 |
| Component B: | PBT(50,000), % | 40 | 41.4 | 40 | 40 | 40 |
| Component C: | SEBS, % | 12 | 9.1 | 12 | 12 | 12 |
| Component D: | PC(50,000), % | 8 | 8.1 | 8 | 8 | 8 |
| Component E: | TGIC, phr. | — | 0.5 | 0.8 | — | 0.8 |
| Izod impact strength, joules/m. | | 107 | 166 | 267 | 112 | 529 |
| Heat distortion temp., °C. | | — | 166 | 156 | — | — |
| Tensile strength at yield, MPa. | | 44.9 | — | 46.0 | — | — |
| Tensile elongation, % | | 45 | — | 58 | — | — |

EXAMPLE 14

Test bars of the composition of Example 11 were immersed in gasoline for three days under stress. At the end of this time, the Izod impact strength was 155 joules/m., the tensile strength at yield was 27.1 MPa., and the tensile elongation was 20%. Upon immersion of similar test bars in water at room temperature or at its boiling point for three days, and upon aging at 80° C. for one week, weight and dimensional changes substantially less than 1% were observed.

EXAMPLES 15–22

Following the procedure of Example 9, compositions were prepared from the product of Example 3 and its atmospherically vented counterpart. The relevant parameters and test results are given in Table II.

TABLE II

| | Example | | | | | | | |
|---|---|---|---|---|---|---|---|---|
| | 15 | 16 | 17 | 18 | 19 | 20 | 21 | 22 |
| Component A: Example 3, % | 40 | 40 | 40 | 40 | 42 | 40 | 40 | 40* |
| Component B, %: | | | | | | | | |
| PBT(50,000) | 40 | 40 | 40 | 40 | 42 | — | 40 | 40 |
| PBT(25,000) | — | — | — | — | — | 40 | — | — |
| Component C, % | | | | | | | | |
| SEBS | 12 | 12 | 12 | 12 | 12 | 12 | — | 12 |
| SB(H) | — | — | — | — | — | — | 12 | — |
| Component D, %: | | | | | | | | |
| PC(50,000) | 8 | 8 | 8 | — | — | — | 8 | 8 |
| PC(71,000) | — | — | — | 8 | 4 | 8 | — | — |
| Component E: TGIC, phr. | 0.8 | 0.32 | 0.5 | 0.8 | 0.8 | 0.8 | 0.8 | 0.8 |
| Izod impact strength, joules/m. | 790 | 673 | 828 | 806 | 395 | 192 | 219 | 155 |
| Heat distortion temp., °C. | 177 | 148 | 175 | 158 | — | 156 | 172 | — |
| Tensile strength at yield, MPa. | 46.9 | 47.9 | 50.1 | 46.9 | — | 45.5 | 47.6 | — |
| Tensile elongation, % | 96 | 54 | 106 | 69 | — | 48 | 40 | — |

*Non-vacuum vented.

EXAMPLE 23

Test bars of the composition of Example 15 were immersed in gasoline for four days under stress. At the end of this time, the Izod impact strength was 769 joules/m., the tensile strength at yield was 33.9 MPa. and the tensile elongation was 144%.

EXAMPLES 24–28

Following the procedure of Example 9, compositions were prepared in which components A, C and D varied in additional respects. The relevant parameters and test results are given in Table III.

TABLE III

| Example | 24 | 25 | 26 | 27 | 28 |
|---|---|---|---|---|---|
| Component A, %: | | | | | |
| PPE | — | 40 | 40 | 40 | 30 |
| Example 6 | 40 | — | — | — | — |
| Component B: PBT(50,000), % | 40 | 40 | 40 | 40 | 41 |
| Component C, %: | | | | | |
| SEBS | 12 | 12 | 12 | — | 14 |
| CS | — | — | — | 12 | — |
| Component D, %: | | | | | |
| PC(50,000) | 8 | 8 | — | 8 | 10 |
| PC(192,000) | — | — | 8 | — | — |
| PE-PC | — | — | — | — | 5 |
| Component E: TGIC, phr. | 0.8 | 0.5 | — | 0.5 | — |
| Izod impact strength, joules/m. | 785 | 769 | 764 | 486 | 812 |
| Tensile strength at yield, MPa. | — | — | — | — | 36.0 |
| Tensile elongation, % | — | — | — | — | 99 |
| Heat distortion temperature, °C. | — | 167 | — | — | 134 |

EXAMPLES 29–31

Following the procedure of Example 9, compositions were prepared using as components B and D the following preextruded blend:

| | |
|---|---|
| PBT(50,000) | 69.55% |
| PC(50,000) | 15% |
| PBT impact modifier | 15% |
| Stabilizers, exchange suppressor | 0.45%. |

The PBT impact modifier was "KM-330", a poly(butyl acrylate)-poly(methyl methacrylate) core-shell polymer commercially available from Rohm & Haas Company.

The parameters and test results for Examples 29–31 are given in Table IV.

TABLE IV

| Example | 29 | 30 | 31 |
|---|---|---|---|
| Component A, %: | | | |
| PPE | — | 36.6 | 36.6 |
| Example 3 | 36.6 | — | — |
| Component B, %: | 36.4 | 36.4 | 36.4 |
| Component C: SEBS, % | 11.2 | 11.2 | 11.2 |
| Component D, %: | 7.9 | 7.9 | 7.9 |
| Component E: TGIC, phr. | 0.4 | 0.4 | — |
| KM-330, % | 7.9 | 7.9 | 7.9 |
| Izod impact strength, joules/m. | 721 | 192 | 198 |

EXAMPLE 32

A blend of 520 parts of the product of Example 8, 400 parts of PBT(50,000), 80 parts of PC(50,000) and 8 parts of TGIC was extruded on a single-screw extruder at 260°–310° C. The product contained 40% inactivated polyphenylene ether, 40% polyester, 12 parts SEBS, 8 parts polycarbonate and 0.8 phr. of TGIC (or reaction products thereof), and had an impact strength of 246 joules/m.

EXAMPLES 33–34

A twin screw extruder with two vacuum vents and two charging ports, one downstream from the other, was used. The first port was charged with 30 parts of a polyphenylene ether similar to PPE but prepared without a vacuum venting step, 14 parts of SEBS and minor proportions of stabilizers and pigments. These materials were extruded at temperatures in the range of about 315°–350° C. and pressures in the range of about 150–205 torr. There were added through the downstream port 46 parts of PBT(50,000) and 10 parts of PC(66,000) or PC(192,000), and extrusion was continued at temperatures in the range of 260°–315° C. and pressures of about 635 torr. The extrudates were the desired products, both of which yielded test results approximating the following:

| | |
|---|---|
| Izod impact strength | 534 joules/m. |
| Tensile strength at yield | 44.8 MPa. |
| Tensile elongation | 64.1 MPa. |
| Flexural strength | 1.79 GPa. |
| Flexural modulus | 29% |
| Heat distortion temperature | 154° C. |

EXAMPLES 35–38

Following the procedure of Example 9, compositions were prepared in which various polycarbonates were used as component D. The relevant parameters and test results are given in Table V.

TABLE V

| Example | 35 | 36 | 37 | 38 |
|---|---|---|---|---|
| Component A, %: | | | | |
| PPE | 40 | — | — | — |
| Example 2 | — | 40 | 40 | 40 |
| Component B: PBT(50,000), % | 40 | 40 | 40 | 40 |
| Component C: SEBS, % | 12 | 12 | 12 | 12 |
| Component D; %: | | | | |
| PC-Trans | 8 | 8 | 8 | — |
| Allyl-PC | — | — | — | 8 |
| Component E: TGIC, phr. | — | — | 0.5 | — |
| Izod impact strength, joules/m. | 182 | 256 | 828 | 278 |

EXAMPLES 39–49

Following the procedure of Example 9, compositions were prepared containing 40% of the inactivated polyphenylene ether of Example 3, 40% PBT(50,000), 12% SEBS, 8% PC(50,000) and, as component E, various materials. The identity of these materials and the test results are given in Table VI.

TABLE VI

| Example | Component E Identity | Amt. phr. | Izod impact strength joules/m. | Tensile strength at break MPa. | Tensile elongation, % |
|---|---|---|---|---|---|
| 39 | — | — | 219 | 38.8 | 45 |
| 40 | TGIC | 0.8 | 673 | 42.7 | 78 |
| 41 | GMA | 1.0 | 764 | 42.8 | 71 |
| 42 | GMA-AA(15) | 1.0 | 657 | 41.7 | 50 |
| 43 | GMA-AA(30) | 1.0 | 678 | 43.8 | 66 |
| 44 | GMA-S-M | 1.0 | 609 | 47.9 | 79 |
| 45 | GMA-S | 1.0 | 710 | 46.5 | 98 |
| 46 | GMA-M | 1.0 | 587 | 48.2 | 86 |
| 47 | GMA-S-A(10A) | 1.0 | 657 | 41.4 | 53 |
| 48 | GMA-S-A(10B) | 1.0 | 684 | 40.2 | 49 |
| 49 | GMA-S-A(20) | 1.0 | 646 | 43.2 | 65 |

The results in Table VI show the improvement in impact strength which results from the incorporation of various species of component E in the compositions of this invention. Such compositions containing component E also have high impact strengths at low temperatures. For example, the composition of Example 49 had an Izod impact strength at −40° C. of 198 joules/m.

EXAMPLES 50–52

Blends similar to those of Examples 39–49 were prepared, substituting PPE for the product of Example 2. The results are given in Table VII.

TABLE VII

| Example | Component E Identity | Amt., phr. | Izod impact strength, joules/m. |
|---|---|---|---|
| 50 | — | — | 294 |
| 51 | GMA | 1.0 | 680 |
| 52 | GMA-M | 1.0 | 660 |

EXAMPLES 53–57

These examples show the effect on polyester melt viscosity of premixing the polyester with component E. Premixing was effected by dry blending followed by melt extrusion. The melt viscosities, or, in some cases, melt flow rates (which are inversely proportional to melt viscosities) were compared with those of controls which had been similarly extruded without the addition of component E. The melt viscosity of the polyester before extrusion was about 7,500 poises.

The relative parameters and test results are given in Table VIII.

TABLE VIII

| Example | Component E Identity | Amt., % | Melt viscosity, poises | Melt flow rate, g./10 min. |
|---|---|---|---|---|
| Controls | — | — | 5,900 | 38:7 |
| 53 | TGIC | 0.5 | 41,000 | — |
| 54 | TGIC | 1.0 | >135,000 | — |
| 55 | GMA | 1.0 | — | 5.0 |
| 56 | GMA-M | 1.0 | — | 3.4 |
| 57 | GMA-S-A(20) | 1.0 | — | 4.5 |

EXAMPLES 58–61

Following the procedure of Example 9, compositions were prepared containing 40% of the inactivated polyphenylene ether of Example 2, 40% poly(butylene terephthalate) which had been premixed with TGIC as described in Examples 53–54, 12% SEBS and 8%

PC(50,000). They were compared with Controls I and II prepared from untreated poly(butylene terephthalates), and Control III, wherein the TGIC was dry blended with all of the other components. The relative parameters and test results are given in Table IX.

TABLE IX

|  | Example | | | | Control | | |
|---|---|---|---|---|---|---|---|
|  | 58 | 59 | 60 | 61 | I | II | III |
| Component B, mol. wt. | 25,000 | 25,000 | 25,000 | 50,000 | 25,000 | 50,000 | 25,000 |
| Component E (TGIC): | | | | | | | |
| % based on polyester | 0.5 | 1.0 | 2.0 | 0.5 | 0 | 0 | — |
| Amt. in blend, phr. | 0.2 | 0.4 | 0.8 | 0.2 | | | 0.8 |
| Izod impact strength, joules/m. | 224 | 256 | 570 | 500 | 80 | 220 | 192 |

EXAMPLE 62

This example demonstrates the effect on impact strength of nitrogen content and molecular weight of the polyphenylene ether. Blends were prepared by the procedure of Example 9, using as component D two different bisphenol A polycarbonates prepared interfacially and as component A a number of polyphenylene ethers prepared by procedures which did not include functionalization or vacuum venting. Components B and C were PBT(50,000) and SEBS, respectively. The results are given in Table X.

TABLE X

| Polyphenylene ether IV, dl./g. | Nitrogen, ppm. | Polycarbonate mol. wt. | Izod impact strength, joules/m. |
|---|---|---|---|
| 0.46 | 1020 | 50,000 | 20 |
| 0.40 | 1115 | " | 20 |
| 0.29 | 497 | " | 78 |
| 0.18 | 353 | " | 22 |
| 0.53 | 576 | " | 57 |
| 0.46 | 1020 | 66,000 | 26 |
| 0.40 | 1115 | " | 26 |
| 0.29 | 497 | " | 115 |
| 0.18 | 353 | " | 22 |
| 0.53 | 576 | " | 265 |

It will be seen that comparatively high impact strengths are obtained by using a polyphenylene ether having a nitrogen content no greater than 800 ppm. and an intrinsic viscosity of at least 0.25 dl./g.

EXAMPLE 63

This example shows the effect of fumaric acid level in the inactivated polyphenylene ether on the impact strengths of the compositions. The procedure of Example 9 was employed to prepare compositions from 40% of various fumaric acid-inactivated polyphenylene ethers, 40% PBT(50,000), 12% SEBS, 8% PC(50,000) and, in certain cases, 0.32 phr. of TGIC. The impact strengths of the compositions are given in Table XI.

TABLE XI

| Polyphenylene ether | TGIC | Impact strength, joules/m. |
|---|---|---|
| Ex. 2 | No | 155 |
| Ex. 4 | No | 198 |
| Ex. 5 | No | 294 |
| Ex. 2 | Yes | 700 |
| Ex. 4 | Yes | 774 |
| Ex. 5 | Yes | 726 |

It is apparent that increasing levels of fumaric acid result in substantial increases in impact strength in the absence of component E. The presence of component E inherently causes such a profound increase in impact strength that the effect of fumaric acid level becomes insignificant.

EXAMPLES 64–71

Following the procedure of Example 9, except that extrusion was at 257°–268° C., blends of 40 parts of various polyphenylene ethers, 40 parts of PBT-CL, 12 parts of SEBS, parts of various polycarbonates and, in some cases, 0.8 phr. of TGIC were extruded and molded. The impact and tensile properties of the resulting compositions are given in Table XII.

TABLE XII

| Example | Component A | Component D | TGIC | Impact strength, joules/m. | Tensile strength at break, MPa. | Tensile elongation, % |
|---|---|---|---|---|---|---|
| 64 | PPE | PC(50,000) | no | 69 | 28.5 | 53 |
| 65 | PPE | PC(50,000) | yes | 128 | 30.8 | 68 |
| 66 | PPE | PC(192,000) | no | 203 | 30.6 | 94 |
| 67 | PPE | PC(192,000) | yes | 641 | 32.1 | 118 |
| 68 | Ex. 2 | PC(50,000) | no | 96 | 28.5 | 44 |
| 69 | Ex. 2 | PC(50,000) | yes | 123 | 31.6 | 96 |
| 70 | Ex. 2 | PC(192,000) | no | 561 | 28.4 | 74 |
| 71 | Ex. 2 | PC(192,000) | yes | 769 | 34.7 | 150 |

It is apparent from these results that compositions of the present invention containing elastomeric polyesters have various impact and tensile values. Both impact strength and tensile strength of these compositions increase with an increase in molecular weight of polycarbonate, and also increase when TGIC is present.

EXAMPLES 72–79

The procedure of Examples 64–71 was repeated, using PPE or the product of Example 2 as component A and substituting for the PBT-CL, as component B, PTME(54,000) or PTME(50,000). The relevant parameters and test results are given in Table XIII.

TABLE XIII

|                                  | 72          | 73          | 74          | 75          | 76          | 77          | 78          | 79          |
|----------------------------------|-------------|-------------|-------------|-------------|-------------|-------------|-------------|-------------|
| Component A                      | PPE         | PPE         | PPE         | Ex. 2       | PPE         | PPE         | PPE         | Ex. 2       |
| Component B                      | PTME (54,000) | PTME (54,000) | PTME (54,000) | PTME (54,000) | PTME (50,000) | PTME (50,000) | PTME (50,000) | PTME (50,000) |
| Component D                      | PC(50,000)  | PC(192,000) | PC(192,000) | PC(192,000) | PC(50,000)  | PC(192,000) | PC(192,000) | PC(192,000) |
| TGIC                             | Yes         | No          | Yes         | Yes         | Yes         | No          | Yes         | Yes         |
| Impact strength, joules/m.       | 342         | 176         | 390         | 443         | 59          | 80          | 117         | 112         |
| Tensile strength at break, MPa.  | —           | 16.2        | 16.0        | —           | 32.4        | 31.6        | 33.4        | —           |
| Tensile elongation, %            | —           | 87          | 79          | —           | 59          | 61          | 77          | —           |

EXAMPLES 80-84

Following the procedure of Examples 64-71, blends were prepared which included various polyphenylene ethers and polycarbonates, SEBS, TGIC (in some examples) and, as component B, either PBT(50,000), PBT-CL, PTME(54,000) or blends thereof. The relevant parameters and test results are given in Table XIV.

TABLE XIV

|                                   | 80   | 81   | 82   | 83   | 84   |
|-----------------------------------|------|------|------|------|------|
| Component A, %:                   |      |      |      |      |      |
| PPE                               | —    | —    | —    | 30   | 30   |
| Example 2                         | 40   | 40   | 40   | —    | —    |
| Component B, %:                   |      |      |      |      |      |
| PBT(50,000)                       | 40   | 20   | —    | 23   | 23   |
| PBT-CL                            | —    | 20   | 40   | 23   | —    |
| PTME(54,000)                      | —    | —    | —    | —    | 23   |
| Component C: SEBS, %              | 12   | 12   | 12   | 14   | 14   |
| Component D, %:                   |      |      |      |      |      |
| PC(50,000)                        | 8    | 8    | 8    | —    | —    |
| PC(192,000)                       | —    | —    | —    | 10   | 10   |
| Component E: TGIC, phr.           | 0.8  | 0.8  | 0.8  | —    | —    |
| Izod impact strength, joules/m.   | 673  | 192  | 122  | 635  | 75   |
| Tensile strength at break, MPa.   | 427  | 37.4 | 31.6 | 34.9 | 22.1 |
| Tensile elongation, %             | 78   | 82   | 96   | 107  | 41   |

The results of Examples 80-82 show that by varying the proportion of PBT and elastomeric polyester in the blend, it is possible to increase tensile elongation with a decrease in impact and tensile strength.

What is claimed is:

1. A resinous composition free from phosphorus-containing flame retardants and comprising the following resinous components and any reaction products thereof, all percentage proportions being by weight of total resinous components:

(A) about 25-60% of at least one polyphenylene ether containing at most 800 ppm. of unneutralized amino nitrogen and comprising a plurality of structural units having the formula

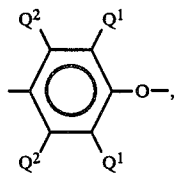

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$ or grafted or coupled derivatives thereof; or a blend thereof with at least one polystyrene;

(B) about 30-60% of at least one polyester selected from the group consisting of (B-1) those consisting essentially of structural units of the formula

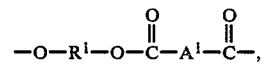

wherein $R^1$ is a saturated $C_{2-10}$ divalent aliphatic or alicyclic hydrocarbon radical and $A^1$ is a divalent aromatic radical containing about 6-20 carbon atoms; (B-2) those consisting essentially of units of formula I and units of the formula

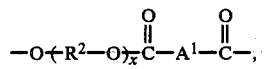

wherein $R^2$ is a saturated $C_{2-4}$ divalent aliphatic hydrocarbon radical and x has an average value of at least about 10; and (B-3) those consisting essentially of units of formula I and units of the formula

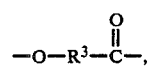

wherein $R^3$ is a $C_{3-6}$ saturated divalent aliphatic hydrocarbon radical;

(C) about 5-25% of at least one elastomeric polyphenylene ether-compatible impact modifier; and (D) 3-20% of at least one polymer containing a substantial proportion of aromatic polycarbonate units and having a weight average molecular weight of at least about 40,000 as determined by gel permeation chromatography relative to polystyrene, or a blend thereof with a styrene homopolymer.

2. A composition according to claim 1 wherein component A is a poly(2,6-dimethyl-1,4-phenylene ether).

3. A composition according to claim 2 which comprises about 30-45% of component A and about 30-50% of component B, and wherein component B consists of component B-1 and the weight ratio of component A to component B is at most about 1.2:1.

4. A composition according to claim 3 wherein component B is poly(ethylene terephthalate) or poly(butylene terephthalate), component C is a block copolymer of at least one alkenylaromatic compound and at least one diene, and the polycarbonate units in component D are bisphenol A carbonate units.

5. A composition according to claim 4 wherein component C is a triblock copolymer wherein the end blocks are derived from styrene and the midblock is derived from at least one of isoprene and butadiene.

6. A composition according to claim 5 wherein the aliphatic unsaturation in the midblock has been removed by selective hydrogenation.

7. A composition according to claim 6 wherein component B is a poly(butylene terephthalate) having a number average molecular weight in the range of about 20,000-70,000.

8. A composition according to claim 7 which is free from framework-forming fillers.

9. A resinous composition consisting essentially of the following resinous components and any reaction products thereof, all percentage proportions being by weight of total resinous components:

(A) about 25–60% of at least one polyphenylene ether containing at most 800 ppm. of unneutralized amino nitrogen and comprising a plurality of structural units having the formula

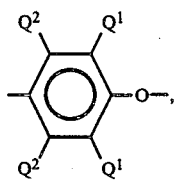

in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$, or grafted or coupled derivatives thereof; or a blend thereof with at least one polystyrene;

(B) about 30–60% of at least one polyester selected from the group consisting of (B-1) those consisting essentially of structural units of the formula

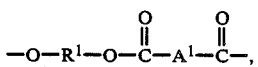

wherein $R^1$ is a saturated $C_{2-10}$ divalent aliphatic or alicyclic hydrocarbon radical and $A^1$ is a divalent aromatic radical containing about 6–20 carbon atoms; (B-2) those consisting essentially of units of formula I and units of the formula

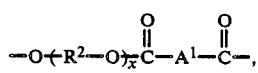

wherein $R^2$ is a saturated $C_{2-4}$ divalent aliphatic hydrocarbon radical and x has an average value of at least about 10; and (B-3) those consisting essentially of units of formula I and units of the formula

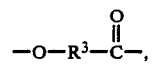

wherein $R^3$ is a $C_{3-6}$ saturated divalent aliphatic hydrocarbon radical;

(C) about 5–25% of at least one elastomeric polyphenylene ether-compatible impact modifier; and (D) 3–20% of at least one polymer containing a substantial proportion of aromatic polycarbonate units and having a weight average molecular weight of at least about 40,000 as determined by gel permeation chromatography relative to polystyrene, or a blend thereof with a styrene homopolymer.

10. A composition according to claim 9 wherein component A is a poly(2,6-dimethyl-1,4-phenylene ether).

11. A composition according to claim 10 which comprises about 30–45% of component A and about 30–50% of component B, and wherein component B consists of component B-1 and the weight ratio of component A to component B is at most about 1.2:1.

12. A composition according to claim 11 wherein component B is poly(ethylene terephthalate) or poly(butylene terephthalate), component C is a block copolymer of at least one alkenylaromatic compound and at least one diene, and the polycarbonate units in component D are bisphenol A carbonate units.

13. A composition according to claim 12 wherein component C is a triblock copolymer wherein the end blocks are derived from styrene and the midblock is derived from at least one of isoprene and butadiene.

14. A composition according to claim 13 wherein the aliphatic unsaturation in the midblock has been removed by selective hydrogenation.

15. A composition according to claim 14 wherein component B is a poly(butylene terephthalate) having a number average molecular weight in the range of about 20,000-70,000.

16. A resinous composition comprising the following resinous components any reaction products thereof, all percentage proportions being by weight of total resinous components:

(A) about 25–60% of at least one polyphenylene ether containing at most 800 ppm. of unneutralized amino nitrogen and comprising a plurality of structural units having the formula

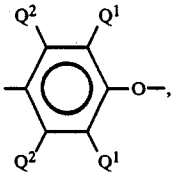

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$, or grafted or coupled derivatives thereof; or a blend thereof with at least one polystyrene;

(B) about 30–60% of at least one of:

(B-2) polyesters consisting essentially of structural units of the formulas

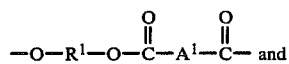 (I)

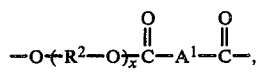 (II)

wherein $R^1$ is a saturated $C_{2-10}$ divalent aliphatic or alicyclic hydrocarbon radical and $A^1$ is a divalent aromatic radical containing about 6–20 carbon atoms and $R^2$ is a saturated $C_{2-4}$ divalent aliphatic hydrocarbon radical and x has an average value of at least about 10;

(B-3) polyesters consisting essentially of units of formula I and the formula

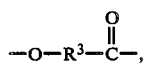 (III)

wherein $R^3$ is a $C_{3-6}$ saturated divalent aliphatic hydrocarbon radical; and mixtures of at least about 5% by weight, based on total component B, of component B-2 or B-3 and (B-1) at least one polyester consisting essentially of units of formula I;

(C) about 5–25% of at least one elastomeric polyphenylene ether-compatible impact modifier; and (D) 3–20% of at least one polymer containing a substantial proportion of aromatic polycarbonate units and having a weight average molecular weight of at least about 40,000 as determined by gel permeation chromatography relative to polystyrene, or a blend thereof with a styrene homopolymer.

17. A composition according to claim 16 wherein component C is a triblock copolymer wherein the end blocks are derived from styrene and the midblock is derived from at least one of isoprene and butadiene.

18. A composition according to claim 17 wherein the aliphatic unsaturation in the midblock has been removed by selective hydrogenation.

19. A composition according to claim 18 wherein component B consists of component B-2, each of $R^1$ and $R^2$ is tetramethylene and $A^1$ is m- or p-phenylene.

20. A composition according to claim 18 wherein component B consists of component B-3, $R^1$ is tetramethylene, $R^3$ is pentamethylene and $A^1$ is m- or p-phenylene.

21. A composition according to claim 18 wherein component B is a mixture of a poly(butylene terephthalate) with component B-2 or B-3.

22. A composition according to claim 18 which comprises about 30–45% of component A, about 30–50% of component B, about 10–20% of component C and 3–12% of component D.

23. A composition according to claim 22 wherein component D is a homopolycarbonate having a weight average molecular weight in the range of about 50,000–200,000.

* * * * *

UNITED STATES PATENT AND TRADEMARK OFFICE
CERTIFICATE OF CORRECTION

PATENT NO. : 4,866,130

DATED : September 12, 1989

INVENTOR(S) : S. Bruce Brown, Dennis J. McFay, John B. Yates, III and Gim F. Lee It is certified that error appears in the above-identified patent and that said Letters Patent is hereby corrected as shown below:

Title page, in the list of inventors, "Gin Furn Lee" should read --Gim F. Lee--.

Signed and Sealed this

Twenty-third Day of October, 1990

Attest:

HARRY F. MANBECK, JR.

*Attesting Officer*      *Commissioner of Patents and Trademarks*